Figure 1:
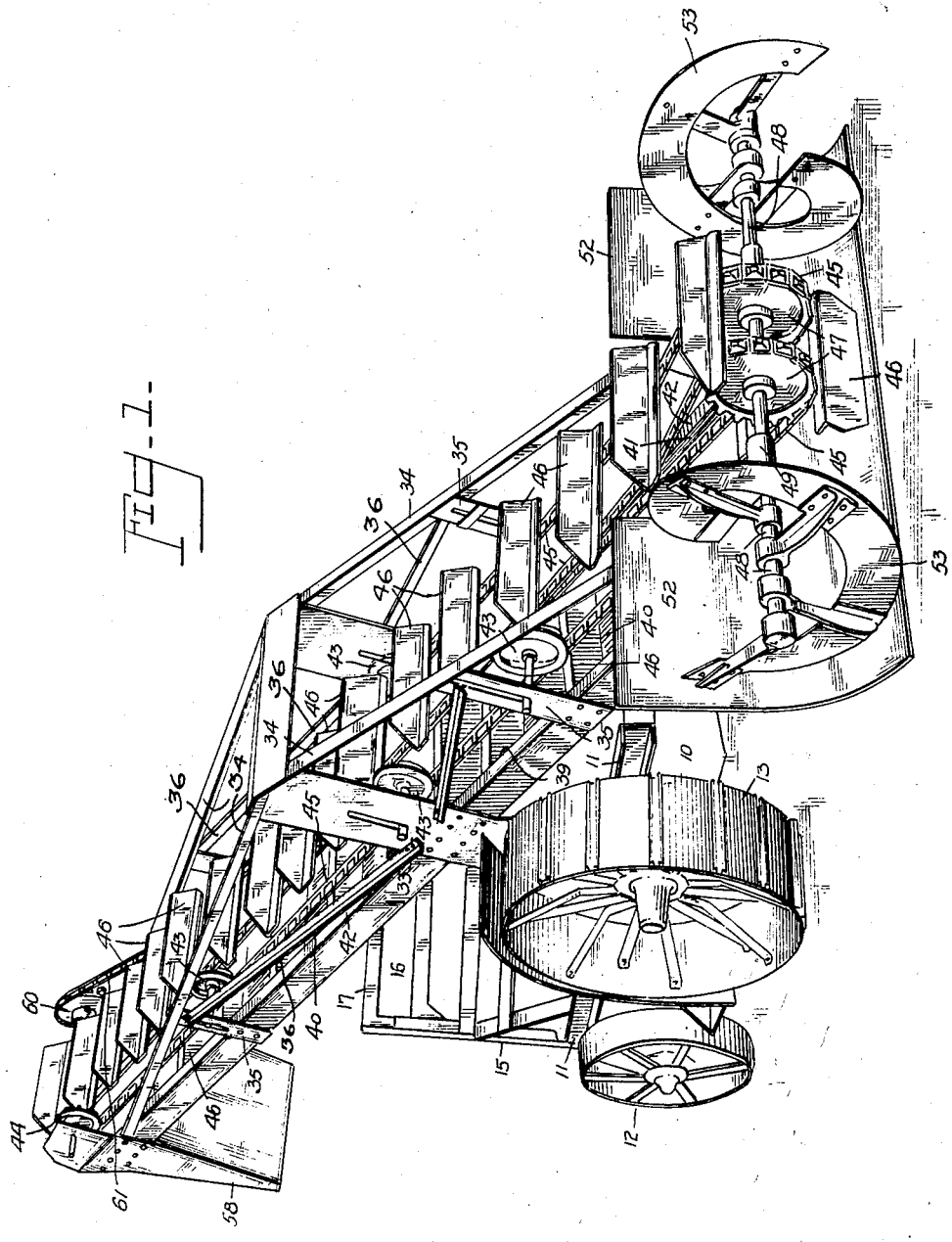

June 17, 1930.  N. P. NELSON ET AL  1,764,084
TRACTOR ATTACHMENT FOR FEEDING AND ELEVATING SNOW
Filed Feb. 12, 1925  3 Sheets-Sheet 1

Nels P. Nelson
Frederic W. James
INVENTORS

By [signature]

their ATTORNEY

June 17, 1930.　　　N. P. NELSON ET AL　　　1,764,084
TRACTOR ATTACHMENT FOR FEEDING AND ELEVATING SNOW
Filed Feb. 12, 1925　　　3 Sheets-Sheet 2
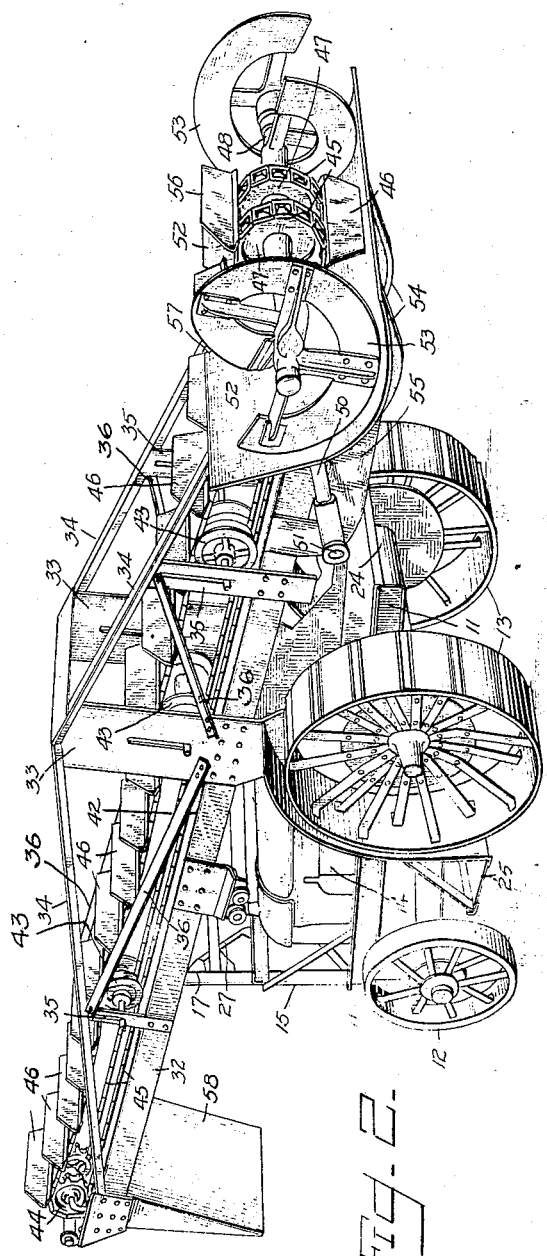
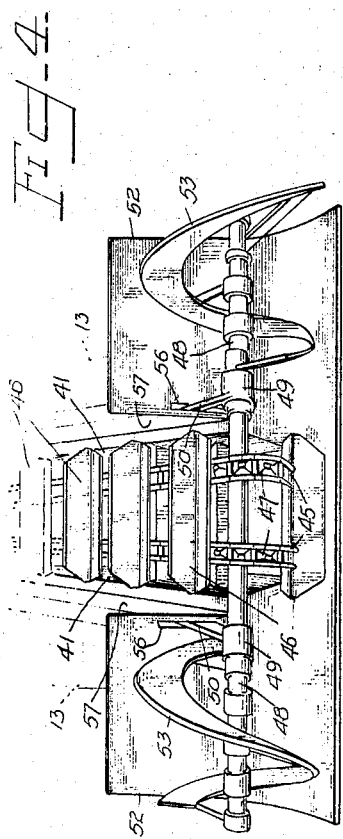
Nels P. Nelson
Frederic W. James
Inventors
By their Attorney

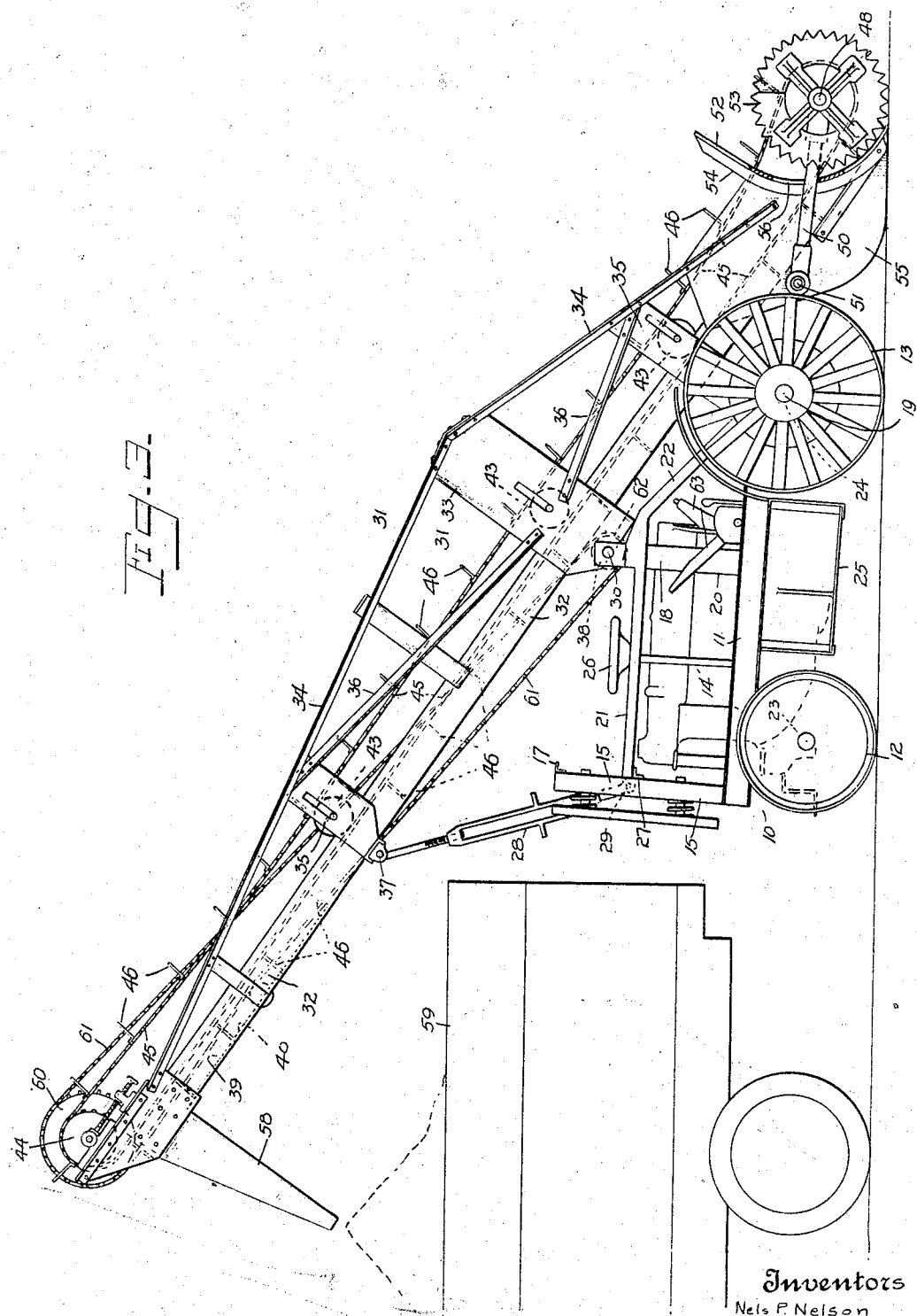

Patented June 17, 1930

1,764,084

UNITED STATES PATENT OFFICE

NELS P. NELSON AND FREDERIC W. JAMES, OF BROOKLYN, NEW YORK, ASSIGNORS TO N. P. NELSON IRON WORKS INC., OF PASSAIC, NEW JERSEY, A CORPORATION OF NEW YORK

TRACTOR ATTACHMENT FOR FEEDING AND ELEVATING SNOW

Application filed February 12, 1925. Serial No. 8,695.

Our invention relates to wagon loading devices and self feeding attachments therefor, and has for its principal object to provide an attachment of this character particularly adapted for tractors and for feeding and elevating snow.

A further object of the invention is to provide a device of this character in which a self feeding attachment is adjustably supported so as to automatically accommodate itself to large pieces of ice or other obstacles which may be picked up during the advance of the loading device.

A still further object of the invention is to provide means for collecting and guiding material laterally into the path of the flights of a loading or elevating conveyor.

With the above objects in view, reference is had to the accompanying drawings, in which, Figure 1 is a perspective view of the loading device in operative position; Figure 2 is a similar view showing the apparatus in portable position; Figure 3 is a side elevational view of the complete device; and Figure 4 is an enlarged rear elevational view of the invention showing the self feeding attachment.

Referring to the drawings in detail, 10 denotes the tractor, preferably a Fordson tractor, having a rectangular chassis or frame 11 supported upon the front and rear wheels 12 and 13, and a power plant 14.

The chassis 11 comprises a frame composed of channel irons, one thereof arranged longitudinally at each side of the tractor. At the front of the frame and secured to the ends of the channel irons are the uprights 15 of a standing frame support 16, the upper ends of the uprights 15 being attached to an overhead angle bar 17, upon which the loading boom is supported when in transporting position, as clearly illustrated in Figure 2. The rearward end of the chassis 11 is provided with an upright standard 18 arranged well forward of the rear wheel axle 19 and comprising parallel uprights 20 connected adjacent their upper ends to forwardly projecting bars 21 which are connected to the front uprights 15. The rearward frame is supported in upright position by means of parallel inclined irons 22 connected at opposite ends to the uprights 20 and extreme rearward ends of the channel irons of the chassis. Suitable front and rear axle connections 23 and 24 are provided to receive and embrace the axles of the tractor wheels 12 and 13. A driver's platform 25 is suspended from the left side of the chassis so as to enable the operator to control the device from the steering wheel 26 and at the same time give him ample opportunity to watch the loading operations of his machine.

The front frame 16 is additionally provided with a frame 27 adapted to receive one end of a turn buckle connection 28 for the upper end of the boom, and comprising a pair of angle irons secured at their lower ends to the uprights 15, adjacent the frame 11, and bent inwardly towards each other at their free ends, and then parallel to each other in upright position. A pin 29 is disposed between the parallel ends to receive the buckle 28.

Disposed transversely of the tractor and carried between the free ends of the rearward frame 18 is a pivot bar 30 upon which the boom is supported and about which it is adjustable to operating and transporting positions, as illustrated, respectively, in Figures 1 and 2.

The boom 31 comprises a truss structure having straight longitudinal frame bars 32, upright side plates 33 disposed substantially rearwardly on the bars 32, and inclined members 34 projecting from the upper ends of the plates 33 to the outer ends of the frame bars 32. Intermediate uprights 35 are arranged along the boom to strengthen the structure, and additional inclined side supporting bars 36 project from the base of the plates 33 upwardly to the upper elevation of the intermediate uprights 35, the forward intermediate upright 35 being provided with a pin 37 to receive the upper end of the turnbuckle connection 28. The upright side plates 33 are provided at their lower ends with saddles 38 which receive and bear upon the opposite ends of the pivot 30 of the chassis 11.

Hereinafter, the end of the boom 31 overlying the front portion of the tractor will be termed the discharge end while the opposite end will be referred to as the feed end. Projecting from one end of the boom 31 to the other is a trough 39 having a bottom wall 40 and inclined side walls 41. The walls 41 are bent at their upper edges to provide flanges 42, which are supported on the longitudinally projecting angle bars 32 forming part of the boom structure. Between the members of each pair of uprights 35 and side plates 33 is arranged an idler flanged roller 43, each thereof being automatically adjustable in a vertical direction in suitable slots disposed in the plates 33 and 35. A pair of sprockets 44 are adjustably mounted on the discharge end of the boom 31, and continuous conveyor chains 45 are supported at the discharge end on these sprockets, the intermediate portions of the chains being supported on the rollers 43. A plurality of spaced flights 46 are carried by the chains 45, so as to bring the lower portion thereof beneath the rollers, and the flights in contact with the walls of the trough 39.

The lower ends of the chains 45 are carried by a pair of sprockets 47 mounted on and rotating with a shaft 48 which is rotatably mounted in bearings 49 carried at the ends of pivoted arms 50, the latter being keyed to stub shafts 51 disposed transversely of the boom and projecting laterally from the sides of a curved guard plate or trough 52. On each side of the sprocket wheels 47, the shaft 48 is provided with oppositely arranged screw conveyor blades 53 arranged so as to move material towards the center and into the path of the flights 46.

The guard plate or trough 52 comprises a curved sheet metal member having its lower edge in contact with the ground, a short distance forward of the line where the screw conveyor touches the ground. Just rearwardly of the horizontal axis of the shaft in operative position, the plate follows a curve, the periphery of which is eccentrically disposed with respect to the screw conveyor blades 53. The plate 52 is reenforced by angle pieces 54 which are attached to wing plates 55 projecting towards the feed end of the boom. The wing plates 55 are provided with brackets 56 to receive and be attached to the ends of the frame bars 32 and inclined members 34. It will be clear that the guard plate or trough 52 becomes an integral part of the boom, while the screw conveyor is capable of arcuate movement with respect to the guard; and in order to accommodate the arms 50, slots 56 are cut in the plate 52 through which the arms project. In addition to the slots 56, the guard plate or trough 52 is cut away, at its central portion, from the upper edge to a point well into the curved portion to provide an opening 57 to accommodate the chains 45 and flights 46, the lower edge of the opening 57 being substantially on the same plane with the bottom of the trough 39, which abuts the rear face of the guard plate 52, and which, together with the trough 52 constitutes a T-shaped construction.

Snow or other material being loaded is elevated to the delivery end of the trough 39 and is discharged into an inclined chute 58 which guides the material into a truck or awaiting vehicle 59 arranged under the chute.

It may be desirable to provide the screw edge of the conveyor blades 53 and effective edges of the flights with saw teeth as clearly shown in Figure 3.

Means for driving the conveyor chains 45, comprises a sprocket wheel 60 on the transverse shaft of the wheels 44 at the discharge end of the boom, and a chain 61 connecting the sprocket 60 with a driving sprocket wheel 62 loosely mounted on the pivot 30 at one side of the tractor, the wheel 62 being controlled by a system of clutch levers 63 and operated by suitable connection with the power plant 14 of the tractor. The shaft 48 is rotated by the chain conveyor connection therewith.

The operation of my improved snow loading device is as follows: The tractor 10 is backed into the material to be loaded until the rotating screw blades 53 are well into the pile of snow or other material, which during the operation of the screw blades is being conveyed by the blades 53 along the trough 52 towards the center, i. e. from each side of the machine. As the material approaches the center it is in the path of the moving conveyor flights 46 traveling through the opening 57 and is pushed through into the trough 39 and thereafter to the discharge end where it is delivered to the chute 58, which guides it into the awaiting truck or other receptacle 59, as clearly illustrated in Figure 3.

It is to be noted that in operation the lower periphery of the feeder revolves in the same direction as the traction wheels of the tractor. This arrangement materially reduces the tractive resistance when working, and is of great advantage when the pavement is icy.

When the boom is in operating position its feeder end is substantially heavier than the discharge end, and the lower edge of the shield scrapes along the ground, clearing up loose or scattered material. As the boom is pivoted, it is free to be adjusted with respect to its inclination to irregularities in the profile of the ground by the adjustment of the turnbuckle 28.

Should ice, stones or other tough material be caught between the edge of the conveyor spirals 53 and the shield plate 52, the entire foot shaft 48 with its appendages will automatically rise up above the obstacle, being restrained by the arms 50, thus avoiding shock and damage to the machinery. In this increased clearance the obstacle will work along the shield into the trough and be carried up by the conveyor flights, thus permitting continuous operation.

The curvature of the trough 52 is so devised that the clearance between the trough and the spirals increases in the direction of rotation, so that fragments of material caught between the edge of the spiral and the plate will work free instead of wedging and jamming.

When handling heavy granular material such as sand or crushed stone, the foot shaft 48 of the conveyor does not remain in its lowest position, but actually floats in the mass of material, and the reason therefor is as follows: The descending conveyor flights as they pass the foot shaft encounter a substantially immovable mass of stone resting on the ground, and the rotative movement produced in the foot shaft by the tension of the conveyor chains, checked by this resistance, lifts the foot shaft upward. As a result of this action it is substantially impossible to impose a greater strain on the chains than is sufficient to lift the foot shaft in the manner described. This automatic limitation of the tension in the conveyor chains relieves the elevating machinery of much shock and stress. It prevents stretching and breakage of chains and other transmission machinery. It prevents stalling the engine of the tractor, and enables the conveyor to handle with safety a greatly increased yardage of material.

What we claim and desire to secure by Letters Patent is:—

1. In a loading device of the character described, a trough, means for elevating material in said trough, means for feeding material from outside the path of the elevating means comprising oppositely disposed screw blades, automatically operated adjustable means for supporting said screws comprising a transverse rotatable member, coplanar arms rigidly attached to said rotatable member, and terminating in bearings for said screws.

2. In a loading device of the character described, a pivoted boom, an elevating conveyor therefor, a trough integral with the feeding end of the boom, oppositely arranged screw blades operating in said trough, and pivoted means carrying said blades and the ground end of said elevator conveyor.

3. In a loading device of the character described, a pivoted boom having a transversely disposed trough at the feed end, a continuous conveyor for said boom, adjustable supporting means for the conveyor, comprising a shaft at the feed end having means to receive the conveyor, a screw conveyor mounted on said shaft at each side of said means and partly embraced by said trough, and pivoted arms having their free ends provided with bearings to receive and support said shaft.

4. In a loading device of the character described, a pivoted boom having a transversely disposed trough at the feed end, a continuous conveyor for said boom, adjustable supporting means for the conveyor, comprising a shaft at the feed end having means to receive the conveyor, a screw conveyor mounted on said shaft at each side of said means and partly embraced by said trough, and pivoted arms twining together and having their free ends provided with bearings to receive and support said shaft.

5. In a loading device of the character described, a pivoted boom having a transversely disposed trough at the feed end adapted to scrape the ground, a continuous conveyor for said boom, adjustable supporting means for the conveyor, comprising a shaft at the feed end having means to receive the conveyor, a screw conveyor mounted on said shaft at each side of said means and partly embraced by said trough, and pivoted arms twining together and having their free ends provided with bearings to receive and support said shaft.

6. In a loading device of the character described, a pivoted boom having a transversely disposed trough at the feed end adapted to scrape the ground, a continuous conveyor for said boom, adjustable supporting means for the conveyor, comprising a shaft at the feed end, having means to receive the conveyor, a rotating conveyor mounted on said shaft and adapted to feed material scraped from the ground from the outside into the path of said first named conveyor, and pivoted arms twining together and having their free ends provided with bearings to receive and support said shaft.

7. In a loading device of the character described, the combination of a feeding attachment comprising a rigid trough having a scraping edge in contact with the ground, pivoted arms carried by the latter and having their free ends projecting into said trough, and a spiral conveyor carried by the free ends of said arms and comprising oppositely arranged blades adapted to operate in said trough and to convey material towards a common center.

8. In a loading device of the character described, the combination of a feeding attachment, comprising a rigid trough having a scraping edge in contact with and adapted to scrape material from the ground, pivoted arms carried by the latter and having their free ends projecting into said trough, and a spiral conveyor carried by the free ends of said arms and comprising oppositely arranged blades adapted to operate in said trough and to convey material towards a common center.

9. In a loading device for tractors, a frame supported on the tractor, a boom pivotally supported on said frame and comprising a structure having a longitudinally arranged trough, a conveyor movable through said trough, means disposed in said structure to carry said conveyor, and a feeding attachment for one end of the boom comprising a transversely arranged trough having an opening into the first trough, oppositely disposed spiral blades for said transverse trough, means for receiving and supporting the end of the boom conveyor, and pivoted arms carried by the trough for rotatably supporting said blades and conveyor supporting means.

10. In a loading device for tractors, a frame supported on the tractor, a boom pivotally supported on said frame and comprising a structure having a longitudinally arranged trough, a conveyor movable through said trough comprising parallel endless chains having transversely arranged spaced flights adapted to contact with the walls of said trough, automatically adjustable means carried by said structure and adapted to support the return portion of said conveyor, means for adjusting the inclination of the boom, and means for feeding material to the flights of the conveyor, said means comprising a pivotally supported screw conveyor unit, sprockets carried by the unit to receive the receiving end of the conveyor chains, and a curved trough integral with the boom and partially embracing the screw conveyors, said trough having an opening in communication with the first trough.

11. In a loading device for tractors, a frame supported on the tractor, a boom pivotally supported on said frame and comprising a structure having a longitudinally arranged trough, a conveyor movable through said trough comprising parallel endless chains having transversely arranged spaced flights adapted to contact with the walls of said trough, means carried by said structure adapted to support return portion of said conveyor means for adjusting the inclination of the boom, means for feeding the conveyor, comprising a transverse pivotally supported screw conveyor unit, and a trough adapted to scrape the ground.

12. In a loading device of the character described, a pair of troughs constituting a T-shaped form, means for elevating material along the trough forming the stem of the T-shape, automatically adjustable means associated with the first means for dislodging and feeding material along the trough forming the cross piece of the T-shape from the outer ends towards the center and into the path of the first means, and an arcuately adjustable shaft carrying the second means and the intake end of the first means.

13. A loading device, as claimed in claim 12, in which the second means comprises a pair of oppositely disposed screw blades mounted on and turning with said shaft and capable of relative movement with the latter to scrape the ground.

In testimony whereof we have affixed our signatures.

NELS P. NELSON.
FREDERIC W. JAMES.